USO05569989A

United States Patent [19]

Acquaviva

[11] Patent Number: 5,569,989
[45] Date of Patent: Oct. 29, 1996

[54] BRUSHLESS ELECTRIC MOTOR CONTROL PROVIDING REDUCED MOTOR TORQUE OSCILLATION

[75] Inventor: Sebastiano Acquaviva, Pino Torinese, Italy

[73] Assignee: United Technologies Motor Systems, Inc., Columbus, Miss.

[21] Appl. No.: 335,525

[22] Filed: Nov. 7, 1994

[30] Foreign Application Priority Data

Nov. 16, 1993 [IT] Italy .................. TO93A0864

[51] Int. Cl.$^6$ .................................................. H02P 6/02
[52] U.S. Cl. .................. 318/254; 318/138; 318/701; 318/801
[58] Field of Search .................. 318/138, 245, 318/254, 439, 700–838

[56] References Cited

U.S. PATENT DOCUMENTS

| | | | |
|---|---|---|---|
| 4,039,912 | 8/1977 | Wada | 318/254 |
| 4,356,437 | 10/1982 | Saito et al. | 318/254 |
| 4,492,903 | 1/1985 | Knight et al. | 318/341 |
| 4,631,459 | 12/1986 | Fujioka et al. | 318/254 |
| 4,733,118 | 3/1988 | Mihalko . | |
| 4,743,815 | 5/1988 | Gee et al. | 318/254 |
| 4,782,272 | 11/1988 | Buckley et al. | 318/254 |
| 4,926,099 | 5/1990 | Ricker et al. | 318/254 |
| 5,010,282 | 4/1991 | Moberg . | |
| 5,012,166 | 4/1991 | Ushijima et al. | 318/254 |
| 5,097,191 | 3/1992 | Bahn | 318/701 |
| 5,109,184 | 4/1992 | Bahn | 318/254 |
| 5,191,269 | 3/1993 | Carbolante . | |
| 5,193,146 | 3/1993 | Kohno | 388/811 |
| 5,220,258 | 6/1993 | Hans et al. | 318/254 |
| 5,260,635 | 11/1993 | Bahn | 318/701 |
| 5,304,902 | 4/1994 | Ueki | 318/254 |
| 5,420,492 | 5/1995 | Sood | 318/809 |
| 5,436,547 | 7/1995 | Nagai | 318/801 |

FOREIGN PATENT DOCUMENTS 0440534  8/1991  European Pat. Off. .

OTHER PUBLICATIONS

Apec 89, 17 Mar. 1989, Baltimore US, pp. 75–80 R. A. Mammano et al 'Driving Three-Phase Brushless DC Motors—A New Low Linear Solution'.

*Primary Examiner*—Paul Ip
*Attorney, Agent, or Firm*—William W. Habelt

[57] ABSTRACT

A continuous current brushless electric motor is disclosed in which the phases (W1, W2, W3) are energized sequentially, so that a time interval exists in which one phase being deactivated and another phase being activated are both energized with current. During this time interval, the current supplied to the phase being deactivated is decreasing while the current supplied to the phase being activated is increasing. The rate of decrease in the current in the phase being deactivated is controlled to be equal approximately to the difference between a predetermined reference current (Iref) and the increasing current in the phase being activated.

7 Claims, 4 Drawing Sheets

BRUSHLESS ELECTRIC MOTOR CONTROL PROVIDING REDUCED MOTOR TORQUE OSCILLATION

CROSS REFERENCE TO RELATED APPLICATIONS

This application relates to the following patent applications filed on Sep. 30, 1994: U.S. application. Ser. No. 08/314,995 (Arty. Docket No. AG-1179) for Method and System for Controlling a Brushless Electric Motor by Sebastiano Acquaviva; and U.S. application Ser. No. 08/314,994 (Atty. Docket No. AG-1178) for a Permanent Magnet Electric Motor Having Reduced Cogging Torque by Sebastiano Acquaviva.

The present invention relates generally to brushless electric motors and, more particularly, to the control of the operation of brushless motors of the type exhibiting reduced electrical noise and electromagnetic interference.

BACKGROUND ART

Permanent magnet brushless motors are alternating-current machines having electronic commutators whose purpose is to energize the windings of the motor in the correct correlation with the induced electromotive forces, sometimes called EMF, so that the motor produces an optimal torque.

In conventional direct current motors, the number of motor phases is equal to the number of windings and all of the phases are in series and are short-circuited to one another. The voltage/speed ratio of the motor determines the total number of turns required in the motor. Each windings must have a number of turns equal to the total number of turns in the motor divided by half of the number of phases in series. Small direct-current motors (50–300 watts) may include from 6 to 20 phases. Direct-current brushless motors require at least one electronic power switch for each of the motor's phases. In order to minimize the cost and the complexity of the electronics necessary for the switching, the number of phases must be reduced. In a typical configuration, brushless motors have two or three phases. The performance of direct-current brushless motors with three phases is comparable to that of a traditional direct-current motor. In a direct-current brushless motor, the number of turns for each phase is determined by the voltage/speed ratio of the motor and is typically higher than the number of turns in a conventional motor, since the phases are not in series. The higher number of turns results in a higher phase inductance and a correspondingly higher electrical time constant.

During switching, the electrical time constant determines the amount of time required for the phase current to rise from an initial level to the desired value. The torque produced by the phase of the motor is low during the switching period because of the low energization of the phase whilst the current rises to the desired value. If the electrical time constant is high, the phase current cannot rise to the desired steady state operating value during the period intended for the excitation of that phase at the operating speed. This causes reduced stedy-state torque performance at high speed. Moreover, the current-rise period generates an elevated current oscillation both in the motor and in the supply line. This oscillation of current produces undesirable electric noise and oscillation of the driving torque, which, in turn, produces undesirable acoustic noise.

A motor that is designed for unipolar or half-wave bridge drive has a time constant that is typically double that of a motor with the same performance designed for a bipolar or full-wave bridge drive. Therefore, the current oscillation in the unipolar motor/drive is a more serious problem than in the bipolar motor/drive. However, the unipolar configuration is typically less expensive than the bipolar configuration because it requires fewer switching devices. Comparing unipolar and bipolar configurations, a solution for the current oscillation problem is more advantageous for the unipolar motor/drive.

In the prior art, phase to phase switching techniques excite only one phase of the motor at a time, which results in undesirable current oscillation and torque variation during the switching transition periods. A conventional direct-current brushless motor is designed in such a way that the waveforms of the electromotive forces induced in the phases overlap each other. Ideally, these waveforms would overlap as illustrated in the first time chart of FIG. 1a. It can easily be seen in this time chart, that when the electromotive force induced in the first phase, E1, is at its maximum value, the electromotive force induced in the second phase, E2, is rising and is lower than the maximum value. Conversely, when the electromotive force E2 reaches the maximum value, the electromotive force E1 begins to decrease. Generally, for each time period, excluding transition, there is one, and only one, electromotive force at the maximum value.

In the second time chart of FIG. 1a, the corresponding currents IF1, IF2 are depicted for the two phases. At the time of transition, the current in the first phase IF1 drops to 0 with an almost vertical descending front. The current in the second phase IF2 rises to the maximum value with a more gradual path and the rate at which it rises to the maximum value is determined by the electric time constant discussed hereinbefore. As a result, the line current is not constant, but rather, as illustrated in the third time chart of FIG. 1a, the line current IL exhibits a "hole" due to the summing of the currents in phases IF1 and IF2. Consequently, the torque produced by the motor TQ, also exhibits a hole, as illustrated in the fourth time chart of FIG. 1a, and has a path that is substantially similar to the path of line current IL.

These oscillations, or holes, in the line current constitute a technical problem because of the resultant electrical noise and electromagnetic interference and the additional components that are required to filter this resultant noise and interference. Moreover, the oscillation of the line current generates a corresponding oscillation of the produced torque, that in turn generates undesirable acoustic noise and results in a reduced mean torque value that degrades motor performance.

SUMMARY OF THE INVENTION

It is an object of the present invention to provide a direct-current brushless motor that exhibits reduced electrical noise and electromagnetic interference through the reduction of oscillations in line current and motor torque.

In accordance with the present invention, a brushless electric motor of the type comprising a plurality of windings or phases is controlled so as to sequentially energize the respective phases to provide continuous current to the motor in such a way that a first phase to be deactivated and a second phase to be activated are both simultaneously energized for a time interval in which the first phase is being deactivated and the second phase is being activated. In this time interval the current in the first phase is controlled so as to be approximately equal to the difference between a pre-determined reference current and the increasing current in the second phase being activated. The pre-determined reference current is advantageously maintained at a constant value, which advantageously may be a function of the number of the or the motor's torque. Preferably, the current in the first phase is controlled during deactivation of the first phase such that the sum of the currents in the first and second phase during the switching time interval is at least approximately equal to the value of the phase current in steady state operation of a single phase.

Advantageously, the phases are arranged in such a way that the electromotive forces induced in the first phase being deactivated and the second phase being activated are simultaneously at their maximum values during at least a portion of this time interval in which the first and second phases are both simultaneously energized.

BRIEF DESCRIPTION OF THE DRAWINGS

Further objects and advantages of the present invention will become evident from the following detailed description aided by reference to the accompanying drawings which are presented for purposes of illustration by example and not limitation, and wherein.

DETAILED DESCRIPTION OF THE PREFERRED EMBODIMENT

Figure 1A:
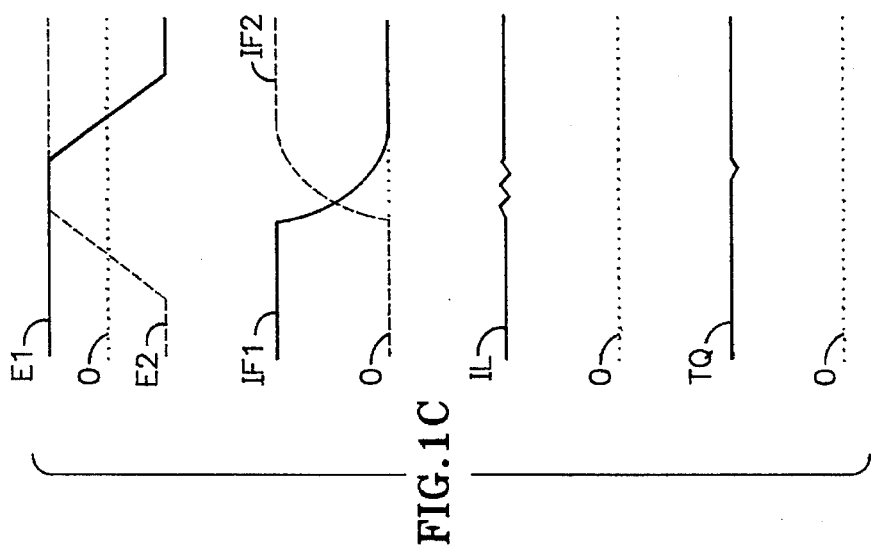
FIG. 1A is a series of four time charts illustrating the variation with time, respectively, of the induced electromotive force, the phase currents, the line current and the motor torque, during operation of a conventional brushless electric motor in accordance with conventional switching procedures.
Figure 1B:
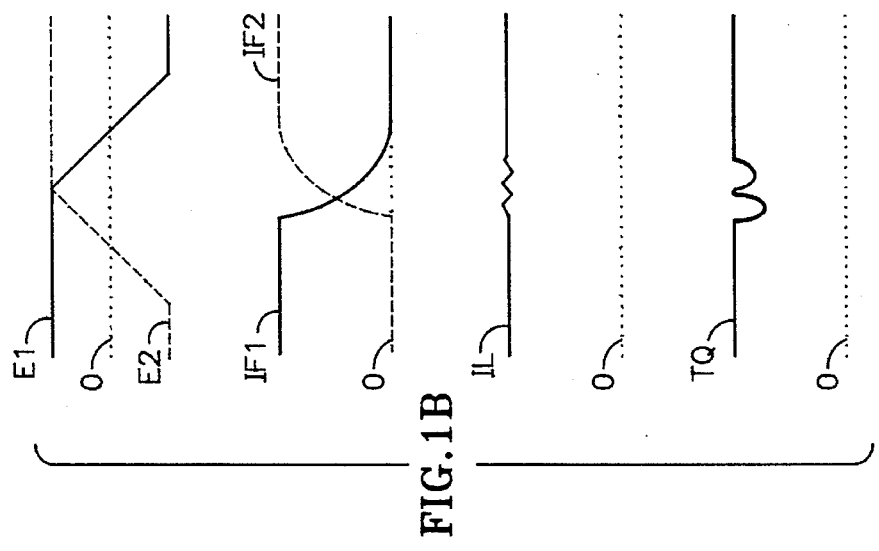
FIG. 1B is a series of four time charts illustrating the variation with time, respectively, of the induced electromotive force, the phase currents, the line current and the motor torque, during operation of a brushless electric motor in accordance with one aspect of the control method of the present invention.

One advantageous aspect of controlling the operation of a conventional brushless electric motor in accordance with the present invention is the resultant reduction in the oscillation of the line current and of the torque of the brushless motor designed in the traditional manner as illustrated in the series of time charts presented in FIG. 1B. Since the motor is of a conventional type, the electromotive forces induced in the first and in the second phases E1, E2, represented in the first time chart are identical to those depicted in the first time chart of FIG. 1A. However, the currents in the first and second phases IF1 and IF2 are controlled in a different manner in accordance with the present invention. That is, the phase current IF1 represented in the second time chart does not abruptly drop to 0 as in the case of a conventional motor switched in a conventional manner as depicted in the second chart of FIG. 1A, but drops instead along a gradual path complementary to the rising path of the current in the second phase IF2. Thus, the line current IL is maintained almost constant, as illustrated in the third time chart in FIG. 1B. Unlike in a conventional motor switched in accord with the prior art, the torque TQ produced in a conventional motor controlled in accordance with the present invention, as illustrated in the fourth time chart of FIG. 1B, exhibits a more constant value with a discontinuity that is less pronounced.

Figure 1C:
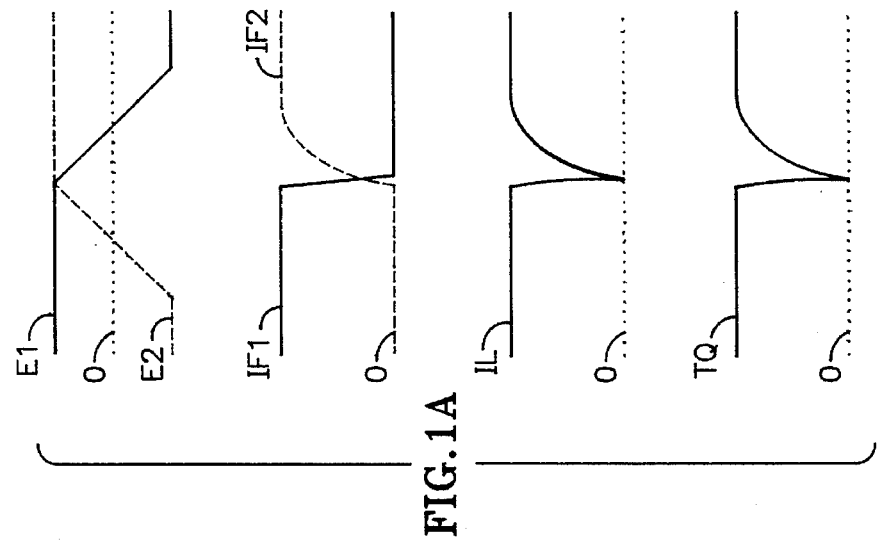
FIG. 1C is a series of four time charts illustrating the variation with time, respectively, of the induced electromotive force, the phase currents, the line current and the motor torque, during operation of a brushless electric motor in accordance with another aspect of the control method of the present invention.

The control method of the present invention may most advantageously be implemented on a brushless electric motor in which the induced electromotive forces actually overlap one another as illustrated in the first time chart of FIG. 1C. As depicted therein, in such an application, a time interval exists in which both the electromotive forces induced in the first and in the second phases E1, E2 are at the maximum value. The current control in phases IF1, IF2, illustrated in the second time chart of FIG. 1C, are again controlled during switching in accordance with the present invention such that the phase current IF1 drops along a gradual path complementary to the rising path of the current in the second phase IF2 and, consequently, the line current IL is again maintained virtually constant as illustrated in the third time chart of FIG. 1C, similarly to the line current in the preceding case. Furthermore, the torque TQ produced in such a motor controlled in accordance with the present invention, as illustrated in the fourth time chart of FIG. 1C, exhibits a substantially constant value with only a very slight discontinuity due to the overlapping of the induced electromotive forces E1, E2 which is readily obtained by maintaining the induced electromotive forces E1, E2 of the two phases both at their maximum values during transition.

In accordance with the control method of the present invention, excitation of the active phase to be cut-off is maintained while the current in the phase to be activated rises to the desired value. During this overlapping period, both the phases are energized. A current control arrangement is used in order to regulate the decreasing current in the phase being deactivated in such a way that the sum of the currents in the two respective phases is constant and equal to the desired current flow, thereby guaranteeing motor operation providing a resultant line current exhibiting a minimal line current oscillation and a motor torque exhibiting minimal oscillation, while producing a minimal electric noise, a minimum acoustic noise and improved motor performance.

Figure 2:
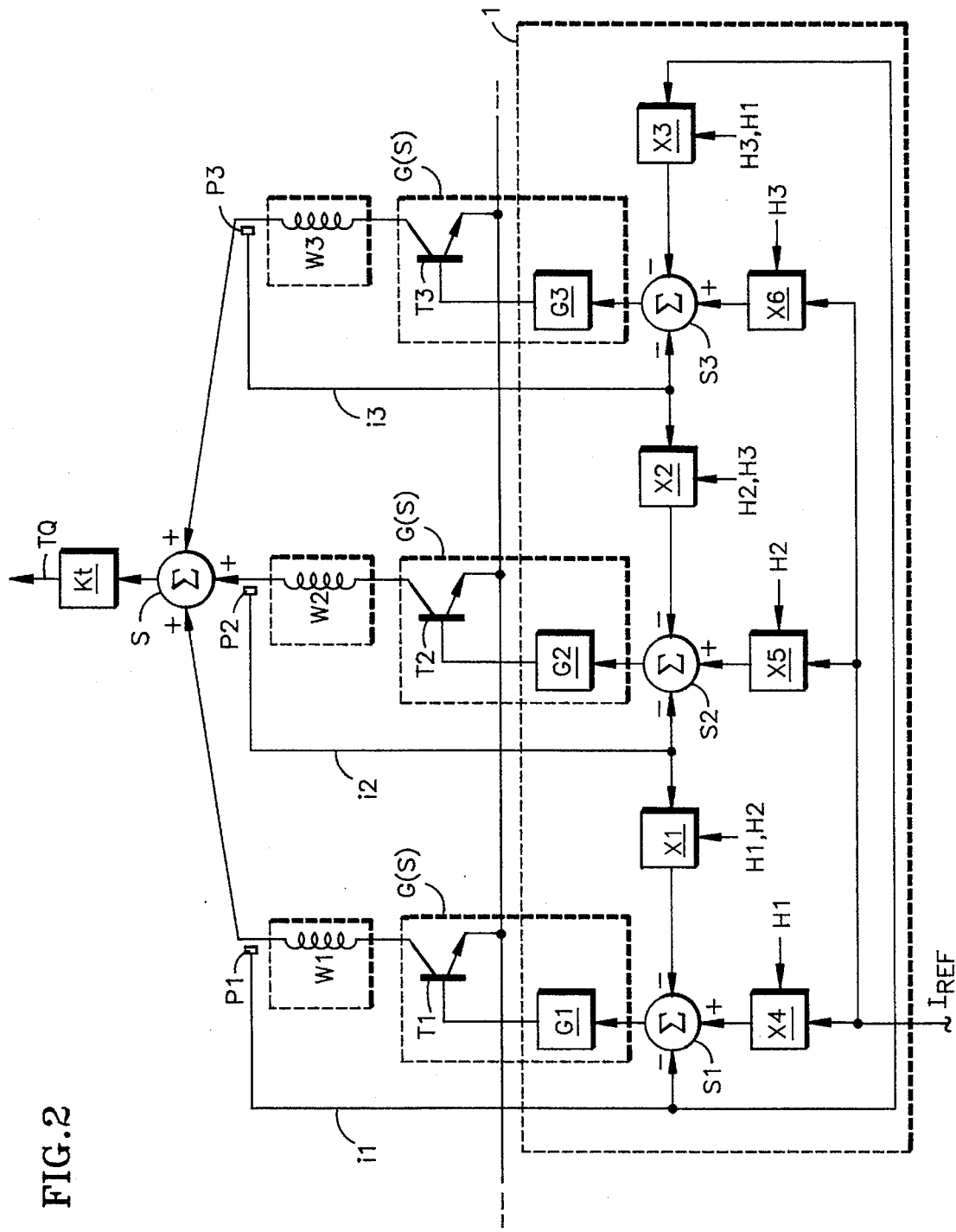
FIG. 2 is a schematic block diagram illustrating an embodiment of a brushless electric motor control system designed in accordance with the present invention.
Figure 3:
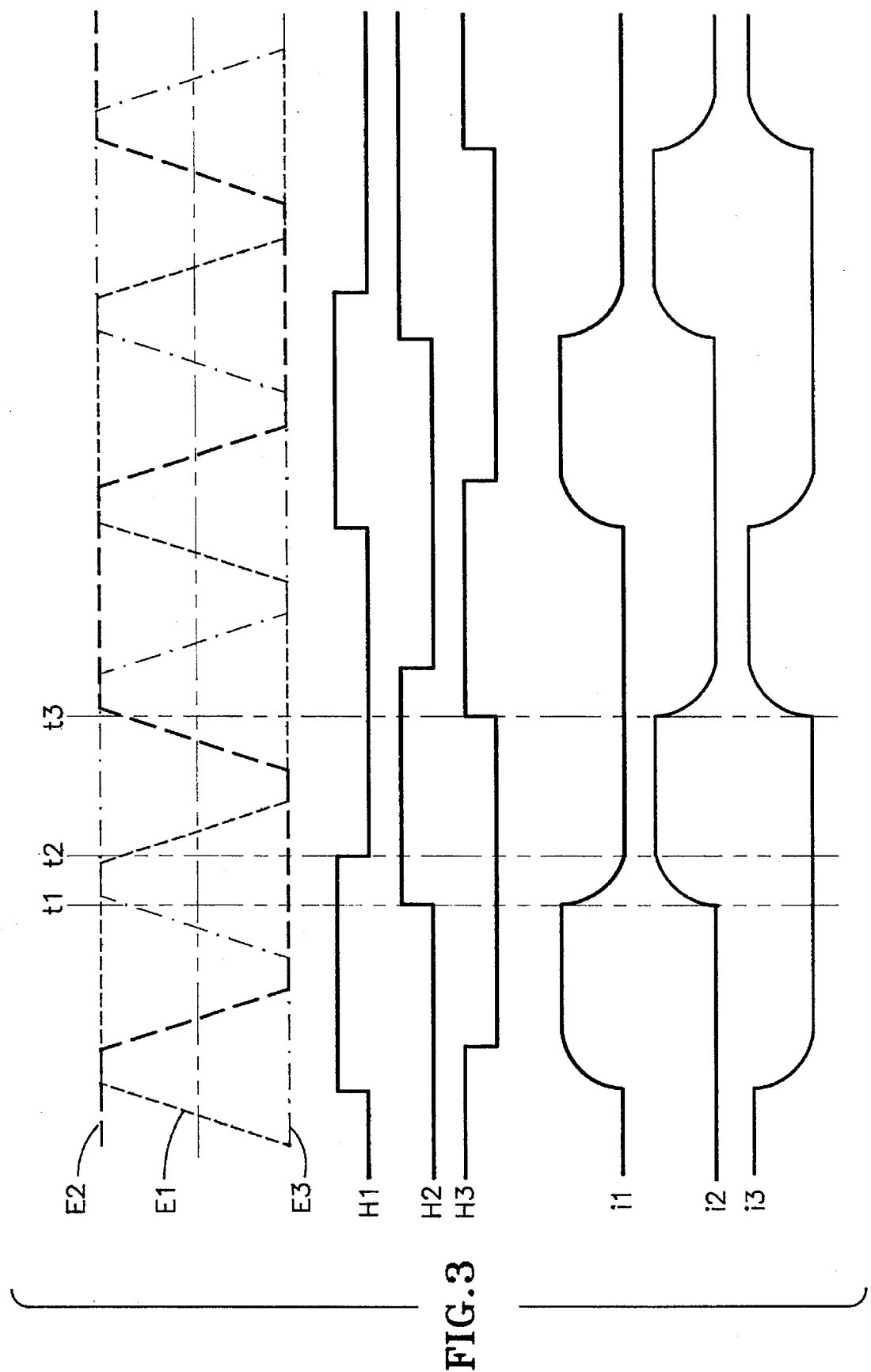
FIG. 3 is a series of four time charts illustrating the variation with time, respectively, of the induced electromotive force, synchronization signals, and the phase currents, during operation of the brushless electric motor depicted schematically in FIG. 2.

One embodiment of a current control system in accordance with the present invention that can be used to implement the method of the present invention is depicted schematically in FIG. 2 and the waveforms associated with the operation of this control system are illustrated in FIG. 3. Referring to FIG. 2, G1, G2, G3, indicate three current control circuits, having the transfer functions G(S), that are connected to transistors T1, T2, T3, respectively. The transistors T1, T2, T3 are connected in series with the three phases or windings W1, W2, W3; the transfer functions of which are 1/(R+SL). The signals H1, H2 and H3, shown in FIG. 3, are control signals used to switch the phases W1, W2, W3 at the appropriate moments, with respect to the electromotive forces E1, E2 and E3 in the respective phases and according to the procedure described herein.

As easily seen in FIG. 3, the three control signals H1, H2 and H3 are logic signals and have time curves that are almost identical to the curves of the electromotive forces E1, E2 and E3 induced in phases W1, W2 and W3, respectively. That is, when the electromotive force E1, for example, has a high value (greater than a reference threshold), the control signal H1 is at a high logic value and, conversely, when the electromotive force E1 does not have a high value, the control signal H1 has a low logic value. The signals H1, H2 and H3 may, for example, be obtained by monitoring the induced electromotive forces E1, E2 and E3 and comparing them with a reference or threshold value, by sensing means such as Hall-effect sensors. The signals H1, H2 and H3 provide information relating to the angular position of the motor's rotor and are used, in this procedure, for synchronization purposes.

The waveform of the currents i1, i2 and i3, which represent the currents (or their respective waveform signals) in phases W1, W2 and W3, respectively, illustrate the operation of the motor in accordance with the method of the present invention. Supposing, for example, that at a given moment, (just prior to time t1) phase W1 is energized as shown in the beginning portion of the diagram in FIG. 3. At this time, the induced electromotive force E1 is at its maximum value and the logic signal H1 is at a high logic level, whereas the other two logic signals H2 and H3 are at a low level. Consequently, the addition node S1 receives a single positive signal, i.e. a reference signal Iref, because the system has a switching circuit X4 that is controlled by the logic signal H1. Therefore, this circuit outputs the reference signal Iref which it receives as input. The switching circuits X1 through X6 output a similar signal that is received as input if the logic control signal is high. If instead, the logic control signal is low, they output a zero signal. The reference signal Iref, supplied by the control system 1, is indicative of the motor's desired current value.

The two switching circuits X5 and X6 are controlled by logic signals H2 and H3, whose outputs are zero. Also, the outputs of the switching circuits X1, X2 and X3 are zero because they are controlled by the AND logic signals of the signal pairs H1, H2; H2, H3; and H3, H1, respectively. Therefore, the control circuit G1 receives an error signal which is given by the reference Signal Iref from which a signal i1 indicative of the current in the phase W1 is subtracted in the addition node S1. In fact, the current control in phases W1, W2 and W3 is controlled by means of signals i1, i2 and i3 which are indicative of the current in the phases. The signals i1, i2 and i3 are detected by current sensors P1, P2 and P3, such as shunt sensors, for example.

Consequently, the control circuit G1 regulates the current in phase W1 at a value equal to the value furnished by the reference signal Iref. The other two phases W2 and W3 are cut off since the corresponding addition nodes S2 and S3 receive only zero signals and the negative signals i2 and i3 as feedback. The currents i1, i2, i3 in the phases W1, W2 and W3, respectively, meet in addition node S, whose output therefore is the total current absorbed by the motor. Essentially, this current absorbed by the motor generates the torque TQ produced by the motor as illustrated schematically by block Kt, representing the transformation of the current to torque.

At the time t1, at which the logic signal H2 becomes high, the phase to phase switching of phase W1 to phase W2 begins. At this moment the switching circuits X1 and X5 as well as X4 also become active, while the others (X2, X3, X6) remain inactive. Consequently, the reference signal Iref and the feedback signal i2 are received at the addition node S2, which means that the current i2 in the phase W2 rises, without being limited in any way by control circuit G2, until it reaches the value given by the Iref. The behavior of the current i2 in phase W2 is limited only by the electrical time constant.

On the other hand, the control for phase W1 changes due to the activation of the switching circuit X1. With the circuit X1 activated, the signal i2 which is indicative of the current in phase W2, also enters the addition node S1, but with a negative sign, that is, as feedback. Therefore, the control circuit G1, operating in a closed hoop, controls the value of the current in phase W1 using Iref-i2 as a reference. This means that the trailing edge of the current is equal to the value Iref minus the current i2.

In practice, the current i2 is subtracted from current i1 so that the relationship i1=Iref-i2 is obtained and therefore, as can be seen in FIG. 3, i1 decreases along a path that is comparable to the path along which current i2 rises. In this way, the line current formed from the sum of the currents in the phases can only remain equal to the value of the Iref signal. Therefore, the current i2 in phase W2 rises at a rate determined by the electrical time constant and by the supply voltage available and the current i1 in phase W1 is also reduced by the closed-loop control arrangement to keep the sum of currents i1 and i2 equal to the reference value Iref.

The Iref value is a pre-determined reference value which, in the simplest case, is constant and the control system 1 thus keeps the current absorbed by the motor constant. Therefore, the reference value Iref may also be variable in the time interval since the reference signal Iref always determines the value of the line current IL, that is, the total current absorbed by the motor, by means of control system 1. The signal Iref may, for example, be a function of the number of turns or the motor's torque.

The time t2 is the maximum time up to which the phase W1 is allowed to remain conductive. At time t2, the logic signal H1 becomes low so that the only logic signal that remains high is signal H2. This situation is similar to the situation described above in which phase W1 was energized and only logic signal H1 was high. In this case, the only energized phase is phase W2, because the only active switching circuit is X5, since this is controlled by logic signal H2, while all of the other switching circuits are inactive. Consequently, the only addition node at which a positive signal (Iref) is received, is node S2, and the corresponding control circuit G2 tries to bring the current i2 in phase W2 up to the value specified by Iref.

If the current i2 reaches a value equal to Iref before time t2, the phase W1 is generally cut off by control circuit G1 and only phase W2 remains energized. Eventually, the electrical time constant, the available voltage supply and the motor's operating speed may, in combination, be such that the current i2 does not reach the Iref value before time t2. Nevertheless, in any case, the current i1 is cut off at time t2 when the switching circuit X4 is deactivated. After time t2, when phase W1 is blocked, only phase W2 remains energized until time t3, when the successive phase to phase switching of phase W2 to phase W3 occurs in a manner exactly as described for phases W1 and W2. The times t1 and t2 may be fixed or variable depending on the current and/or the motor's speed or due to another parameter.

Figure 4:
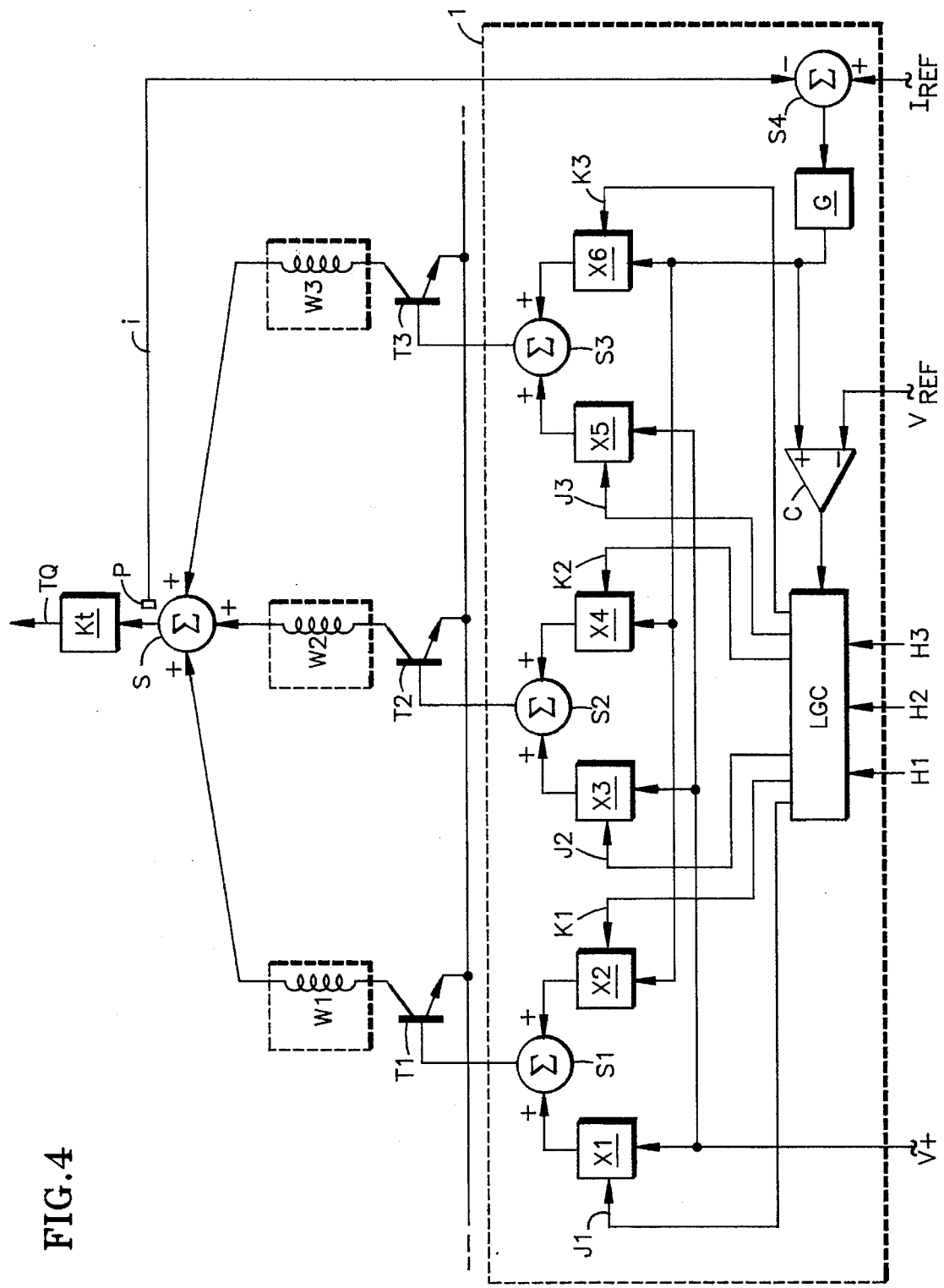
FIG. 4 is a schematic block diagram illustrating an alternate embodiment of a brushless electric motor control system designed in accordance with the present invention.

An alternate embodiment of a current control system which may be used to implement the control method of the present invention is illustrated in FIG. 4. The same letter and number symbols are once again used in FIG. 4 with reference to those elements in FIG. 2 that have already been described. In this embodiment, the control system 1 comprises only one loop to control the current instead of three loops as in the embodiment depicted in FIG. 2 and correspondingly there is only one current control circuit G instead of three. Nevertheless, this updated procedure is almost identical and the waveforms illustrated in FIG. 3 are valid. Accordingly, in the next few paragraphs only those differences in the FIG. 4 embodiment relative to the FIG. 2 embodiment are discussed.

In the FIG. 4 embodiment, the total current i that flows in phases W1, W2 and W3 is detected by way of sensor P and is subtracted from the reference signal Iref in the addition node S4, thereby generating an error signal that is supplied to control circuit G. In the event that only one of the phases is energized, phase W1 for example, the signal generated by control circuit G is supplied only to transistor T1 by means of switching circuit X2 and addition node S1, while all of the other combination circuits, and consequently all the other phases, are inactive.

The switching circuits X1, X2, X3, X4, X5, X6 are controlled by the logic signals J1, K1, J2, K2, J3, K3, respectively, and are generated by a logic circuit LGC based on logic control signals H1, H2, H3. The logic circuit LGC controls the combination circuits X1 through X6 in such a way that the behavior of control system 1 is substantially similar to that of the preceding case.

For example, supposing that phase W1 is energized in the steady state, the logic circuit LGC activates logic signal J2 at the time t1, by means of the signal K1, thus sending the signal V+ to the transistor T2. This causes phase W2 to become energized and the current in this phase begins to increase being limited only by the electrical time constant and not by control circuit G. Since phase W1 is controlled by control circuit G which tries to keep time constant and not by control circuit G. Since phase W1 is controlled by control circuit G which tries to keep the total current i equal to the value of Iref, the current in phase W1 is consequently reduced. In other words, the current that starts to flow in phase W2 is subtracted from the current flowing in phase W1.

At the time t2, logic circuit LGC successively deactivates the K1 signal causing phase W1 to be inhibited, deactivating signal J2 and activating signal K2 rendering phase W2 no longer able to be energized by signal V+, which is accomplished without control, but by the signal output by control circuit G, by means of the combination circuit X4, thus bringing the phase W2 into steady-state operation. Because the current in phase W2 is not generally subjected to any control in the interval between times t1 and t2, it may exceed the Iref value before time t2 at which it is made subject to control Circuit G. In this case, the control system 1 is provided with a mechanism that is capable of intervening in this situation.

Control system 1 comprises a comparator C that detects the time at which the rising current in phase W2 has reached the value given by Iref, in the event that this value is reached before time t2 at which it would be subjected to the control circuit G. This condition is detected by comparing the signal emitted by control circuit G with a reference value Iref. In fact, at the moment at which the current in phase W2 exceeds the Iref value, control circuit G tries to control the current in phase W1 with a negative value. This event is detected by comparator C. The output of comparator C is connected to logic circuit LGC so that the logic circuit LGC effects, in advance, all of the programmed operations for the time t2, at the moment the event described above is detected. Therefore, it is evident that control system 1, described in this alternate embodiment, is functionally identical to control system 1 of the preceding production method except that it has different configurations.

The control method of the present invention may be used with a pulse-width modulated current control (PWM) with equal results. The current in the phase to be energized can be controlled in a manner similar to that described above.

The control method and system aspects of the present invention are distinguished from the prior art in that, in accordance with the present invention, during phase switching, the "next phase" is activated before cutting off the phase currently in operation thereby producing a current flow in two phases at the same time for a brief period of time during switching. A current-control arrangement is used to "shape" the decreasing current along a desired path which complements the path along which the current is rising in the phase being activated Such that the phase currents overlap for a transition period. Due to the establishment and control of the overlapping currents in accordance with the present invention, the operation of the motor exhibits reduced current oscillation, shorter rise times of the current controlled, and reduced torque oscillation. Additionally, reduced acoustical noise is generated due to the reduced torque oscillation and reduced electrical noise (EMI) results from the reduced current and the reduced controlled current rise times. Consequently, the required filtering components may be reduced to a minimum, thereby reducing costs and space requirements. Further, improved motor performance is achievable because of the reduction of the "gap" in the current during switching and reduced magnetostriction and electrodynamic stress results from the controlled current-rise times.

I claim:

1. A brushless electric motor having a plurality of winding phases and a control system for sequentially energizing said plurality of phases to provide continuous current to the motor, said control system comprising:

means for switching current from a winding phase being deactivated to a winding phase being activated such that the winding phases are simultaneously energized for a time interval with current decreasing in magnitude in the winding phase being deactivated and current increasing in magnitude in the winding phase being activated; and means for controlling the rate of decrease of the decreasing current in the winding phase being deactivated so that the magnitude of the decreasing current is approximately equal to the difference in magnitude between a predetermined reference current and the increasing current in the winding phase being activated, thereby reducing oscillations in line current and motor torque.

2. A method for controlling a brushless electric motor having a plurality of winding phases to provide continuous current to the motor, said control method comprising:

switching current from a winding phase being deactivated to a winding phase being activated such that the winding phases are simultaneously energized for a time interval with current decreasing in magnitude in the winding phase being deactivated and current increasing in magnitude in the winding phase being activated; and controlling the rate of decrease of the decreasing current in the winding phase being deactivated so that the magnitude of the decreasing current is approximately equal to the difference in magnitude between a predetermined reference current and the increasing current in the winding phase being activated, thereby reducing oscillations in line current and motor torque.

3. The control system as set forth in claim 1, wherein the means for switching current includes:

a plurality of transistors connected in series with the plurality of winding phases.

4. The control system as set forth in claim 1, wherein the means for controlling includes:

means for generating a plurality of logic control signals relating to rotor angular position;

a plurality of switching circuits controlled by the plurality of logic control signals and providing the predetermined reference current as outputs;

a plurality of current sensors for measuring the magnitude of the current drawn by each winding phase; and means for subtracting the measured magnitudes of the currents from the reference current outputs of the plurality of switching circuits to control the means for switching current such that the magnitude of the decreasing current in the winding phase being deactivated is approximately equal to the difference in magnitude between the predetermined reference current and the increasing current in the winding phase being activated.

5. The control system as set forth in claim 4, wherein the means for generating includes a plurality of Hall-effect sensors.

6. The control system as set forth in claim 1, wherein the means for controlling includes:

means for generating a plurality of logic control signals relating to rotor angular position;

a current sensor for measuring the magnitude of the total current drawn by the plurality of winding phases;

means for subtracting the measured magnitude of the total current from the predetermined reference current to generate an error signal;

a plurality of switching circuits controlled by the plurality of logic control signals and the error signal and providing the error signal and a constant voltage signal as outputs; and means for summing the error signal and constant voltage signal outputs of the plurality of switching circuits to control the means for switching current such that the magnitude of the decreasing current in the winding phase being deactivated is approximately equal to the difference in magnitude between the predetermined reference current and the increasing current in the winding phase being activated.

7. The control system as set forth in claim 6, wherein the means for generating includes a plurality of Hall-effect sensors.

* * * * *

UNITED STATES PATENT AND TRADEMARK OFFICE
CERTIFICATE OF CORRECTION

PATENT NO. : 5,569,989
DATED : October 29, 1996
INVENTOR(S) : Sebastiano Acquaviva It is certified that error appears in the above-indentified patent and that said Letters Patent is hereby corrected as shown below:

Column 1, line 10: "Atry." should be --Atty.--.

Column 1, line 34: "windings" should be --winding--.

Column 1, line 62: "stedy-state" should be --steady-state--.

Column 3, line 7: "of the or" should be --of turns or--.

Column 8, line 21: "Such" should be --such--.

Signed and Sealed this

Third Day of June, 1997

Attest:

BRUCE LEHMAN

*Attesting Officer*      *Commissioner of Patents and Trademarks*